United States Patent [19]
Shih

[11] Patent Number: 5,729,060
[45] Date of Patent: Mar. 17, 1998

[54] HARD DISKDRIVE ADDRESS ADJUSTING DEVICE OF AN ARRAY HARD DISKDRIVE SYSTEM

[76] Inventor: Steven Shih, 1/F., No. 14, Alley 13, Lane 245, Sec. 4, Pa-Teh Rd., Taipei City, Taiwan

[21] Appl. No.: 590,197

[22] Filed: Jan. 23, 1996

[51] Int. Cl.⁶ ............................... H02B 1/24; H05K 5/00
[52] U.S. Cl. .................. 307/112; 307/147; 361/685; 361/725
[58] Field of Search ........................... 307/112, 147; 361/683, 685, 725–727; 360/137; 369/75.1

[56] References Cited

U.S. PATENT DOCUMENTS

| | | | |
|---|---|---|---|
| 4,920,339 | 4/1990 | Friend et al. | 340/825.52 |
| 4,941,841 | 7/1990 | Darden et al. | 439/377 |
| 5,546,276 | 8/1996 | Cutts et al. | 361/724 |
| 5,563,767 | 10/1996 | Chen | 361/685 |

*Primary Examiner*—William M. Shoop, Jr.
*Assistant Examiner*—Jonathan S. Kaplan
*Attorney, Agent, or Firm*—Morton J. Rosenberg; David I. Klein; Jun Y. Lee

[57] ABSTRACT

A hard diskdrive address adjusting device is provided which includes a plurality of rotary binary DIP switches respectively mounted on the hard diskdrives of an array hard diskdrive system. The rotary binary DIP switches adjust the address of each hard diskdrive. Each hard diskdrive of the array hard diskdrive system has a plurality of jumper terminals arranged in two rows, the jumper terminals of one row being connected in parallel with the contact C of the respective rotary binary DIP switch. The jumper terminals of the other row of each hard diskdrive being respectively connected to corresponding contacts of the respective rotary binary DIP switch.

1 Claim, 6 Drawing Sheets

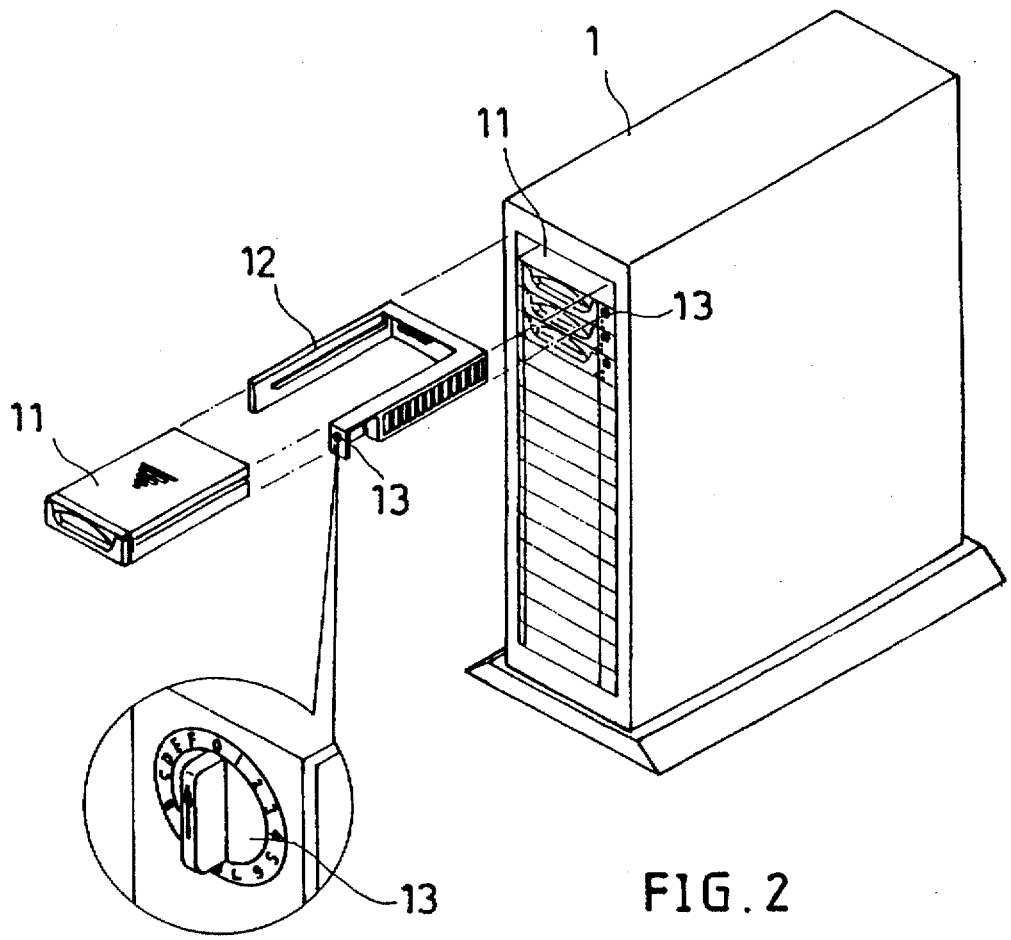
FIG. 2
FIG. 2A
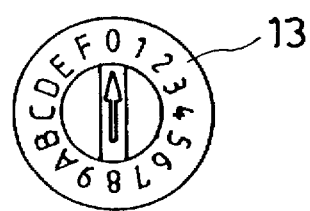
FIG. 2B

HARD DISKDRIVE ADDRESS ADJUSTING DEVICE OF AN ARRAY HARD DISKDRIVE SYSTEM

BACKGROUND OF THE INVENTION

The present invention relates to array hard diskdrive systems. More particularly, the present invention is directed to a hard diskdrive address adjusting device installed in an array hard diskdrive system for adjusting the address of each hard diskdrive conveniently, by rotating a respective rotary binary DIP switch.

An array hard diskdrive system, as shown in FIGS. 5 and 5A, is generally comprised of a housing 2, a plurality of hard diskdrive mounting frames 22 mounted in the housing at different elevations, and a plurality of hard diskdrive cases 21 covered with a respective cover 211 to hold a respective hard diskdrive 23. Each case 21 is slidably mounted in a respective hard diskdrive mounting frame 22. That structure of the array hard diskdrive system has no means to indicate the address of each hard diskdrive. When required to change the address of any hard diskdrive, the hard diskdrive case 21 must be removed from the corresponding hard diskdrive mounting frame 22. Then, the cover 211 must be removed, and then the jumper connectors 232 must be repositioned on the terminals 231 in accordance with the new address. This address procedure is complicated.

SUMMARY OF THE INVENTION

The present invention provides a hard diskdrive address adjusting device which eliminates the aforesaid drawbacks. It is one object of the present invention to provide a hard diskdrive address adjusting device which permits the address of each hard diskdrive of an array hard diskdrive system to be conveniently adjusted. It is another object of the present invention to provide a hard diskdrive address adjusting device which has means to indicate the address of each hard diskdrive of the array hard diskdrive system. According to one embodiment of the present invention, the hard diskdrive address adjusting device comprises a plurality of rotary binary DIP switches respectively mounted on the hard diskdrives of an array hard diskdrive system. The rotary switches are set to adjust the address of each hard diskdrive. Each hard diskdrive of the array hard diskdrive system comprises a plurality of jumper terminals arranged in two lines, the jumper terminals of one line being connected in series to contact C of the respective binary DIP rotary switch, and the jumper terminals of the other line of each drawer type hard diskdrive being respectively connected to corresponding contacts of the respective rotary binary DIP rotary switch. Therefore, the address of each hard diskdrive can be conveniently adjusted by rotating the respective rotary binary DIP switch. When adjusted, the respective rotary binary DIP switch shows the position corresponding to the adjusted address.

BRIEF DESCRIPTION OF THE DRAWINGS

FIG. 2 shows a rotary binary DIP switch mounted on each hard diskdrive mounting frame in an array hard diskdrive system according to the present invention;

FIG. 2A is an enlarged view of a part of FIG. 2, showing the position of the rotary binary DIP switch on one hard diskdrive mounting frame according to the present invention;

FIG. 2B is a front view of the rotary binary DIP switch shown in FIG. 2A;

DETAILED DESCRIPTION OF THE PREFERRED EMBODIMENT

Figure 1:
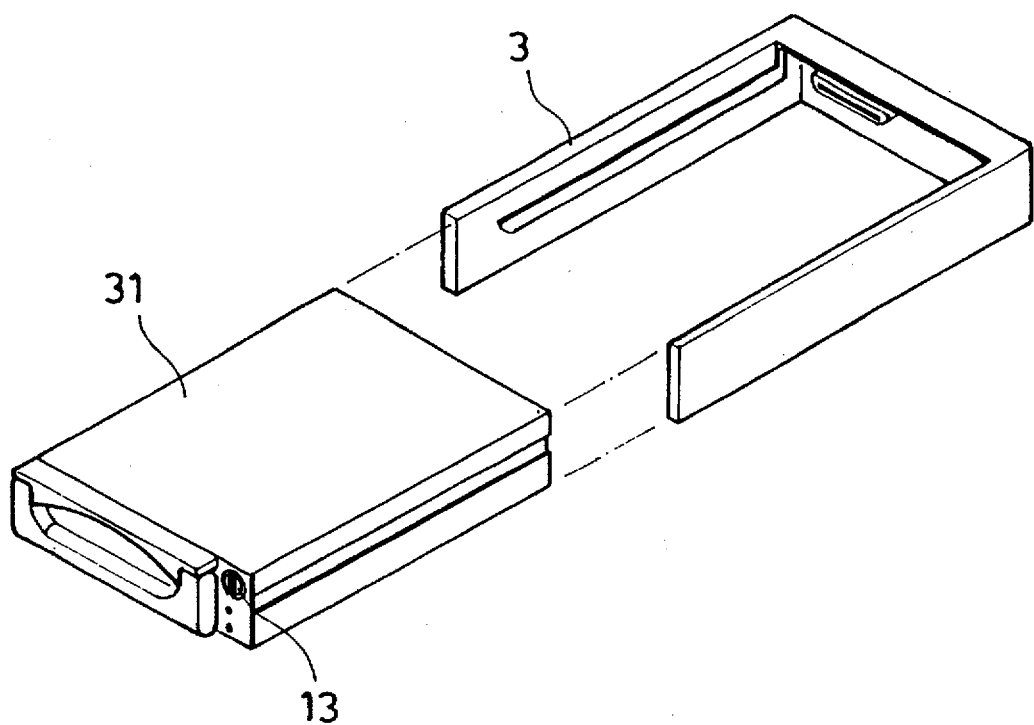
FIG. 1 shows a rotary binary DIP switch mounted on the front side of a hard diskdrive according to the present invention.
Figure 1A:
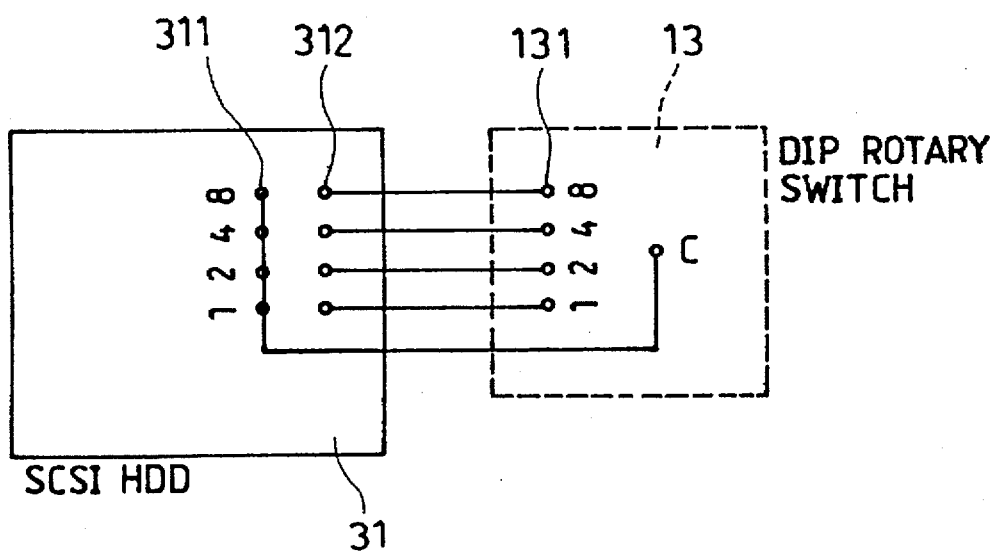
FIG. 1A shows the connection between the jumper terminals of a hard diskdrive and the contacts of a rotary DIP switch according to the present invention.

Referring to FIGS. 1 and 1A, a rotary binary DIP switch 13 is mounted on the front panel of each drawer type hard diskdrive 31 of an array hard disk system. Each drawer type hard diskdrive 31 is slidably mounted in a hard diskdrive mounting frame 3. The jumper terminals of the first line 311 of each drawer type hard diskdrive 31 are connected in parallel to contact C of the respective rotary binary DIP switch 13, and the jumper terminals of the second line 312 of each drawer type hard diskdrive 31 are each respectively connected to the corresponding contacts 131 of the respective rotary binary DIP switch 13. Therefore, the jumper connection between the jumper terminals of the first line 311 and the jumper terminals of the second line 312 can be adjusted by rotating the rotary binary DIP switch 13, i.e. the address of each drawer type hard diskdrive 31 can be changed by rotating the respective rotary binary DIP switch 13. After adjustment, the adjusted address of each hard diskdrive is shown on the face of the respective rotary binary DIP switch 13.

Referring to FIGS. 2, 2A, 2B, and 3, a plurality of hard diskdrive mounting frames 12 are respectively mounted in a housing 1 at different elevations to hold a respective drawer type hard diskdrive 11. A rotary binary DIP switch 13 is mounted on each hard diskdrive mounting frame 12 at the front side. The jumper terminals of the first line 111 of each drawer type hard diskdrive 11 are connected in parallel to contact C of the respective rotary binary DIP switch 13 through a connector 4. The jumper terminals of the second the 112 of each drawer type hard diskdrive 11 are respectively connected to the corresponding contacts 131 of the respective rotary binary DIP switch 13 through the connector 4. Therefore, the jumper connections between the jumper terminals of the first line 111 and the jumper terminals of the second line 112 can be adjusted by rotating the rotary binary DIP switch 13, i.e. the address of each drawer type hard diskdrive 11 can be changed by rotating the respective rotary binary DIP switch 13.

Figure 4:
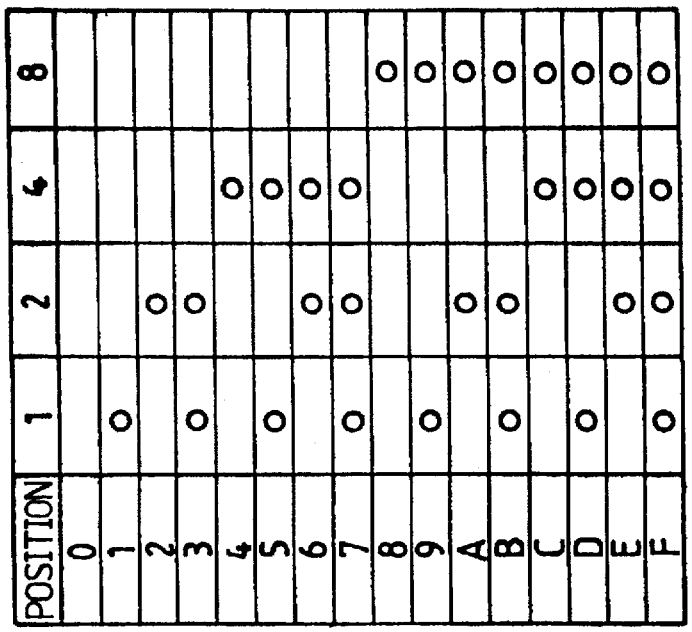
FIG. 4 is a diagram indicating the connection between the jumper terminals of the hard diskdrive and the contacts of rotary binary DIP switch at each position.
Figure 3:
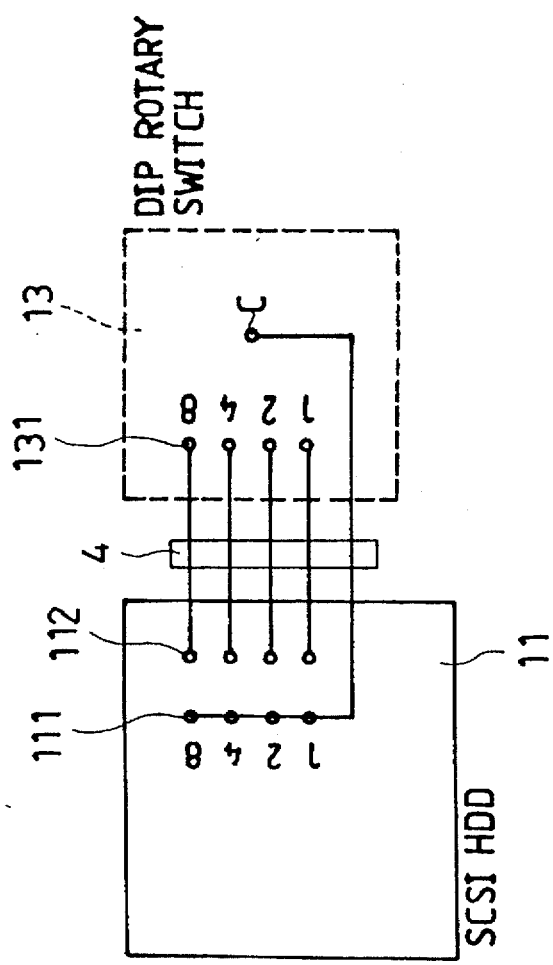
FIG. 3 shows a connector connected between the jumper terminals of a hard diskdrive and the contacts of a rotary binary DIP switch according to the present invention.
Figure 3A:
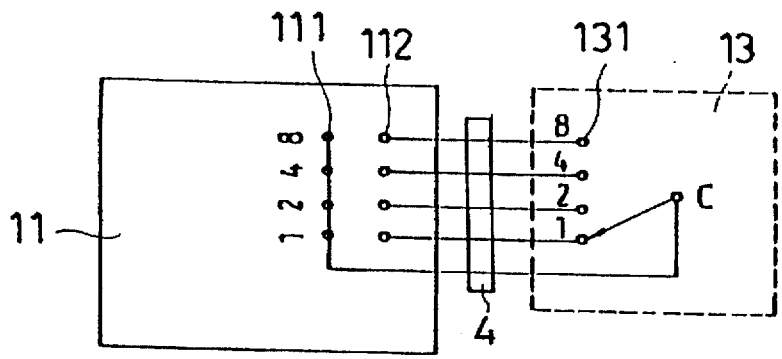
FIG. 3A is an illustration similar to that of FIG. 3, but showing the rotary binary DIP switch switched to the first position.
Figure 3B:
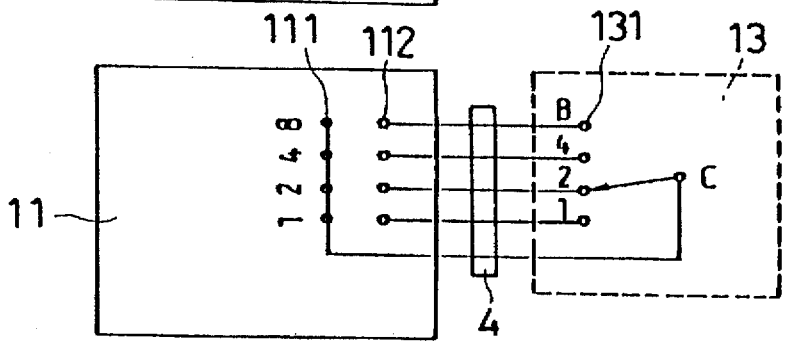
FIG. 3B is an illustration similar to that of FIG. 3, but showing the rotary binary DIP switch switched to the second position.
Figure 3C:
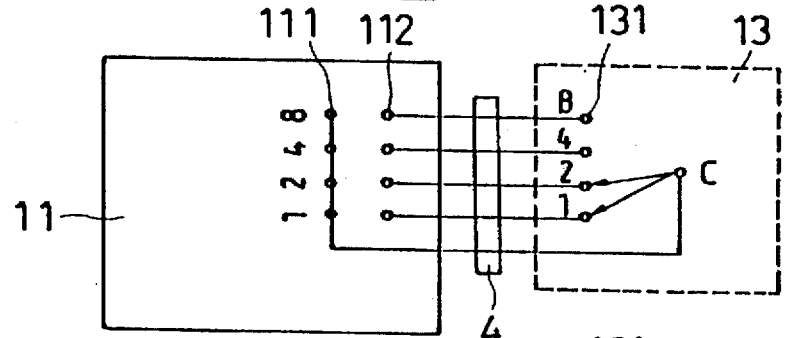
FIG. 3C is an illustration similar to that of FIG. 3, but showing the rotary binary DIP switch switched to the third position.
Figure 3D:
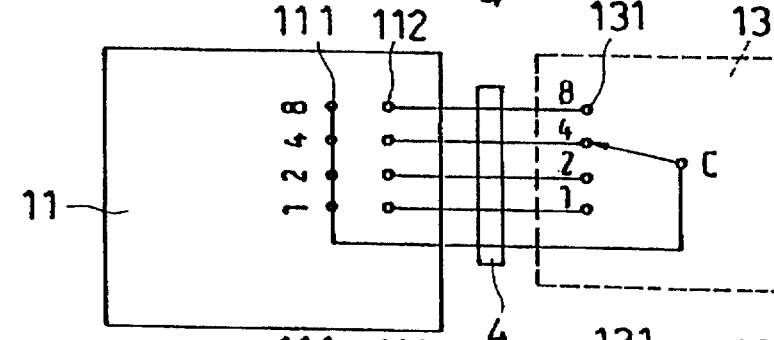
FIG. 3D is an illustration similar to that of FIG. 3, but showing the rotary binary DIP switch switched to the fourth position.
Figure 3E:
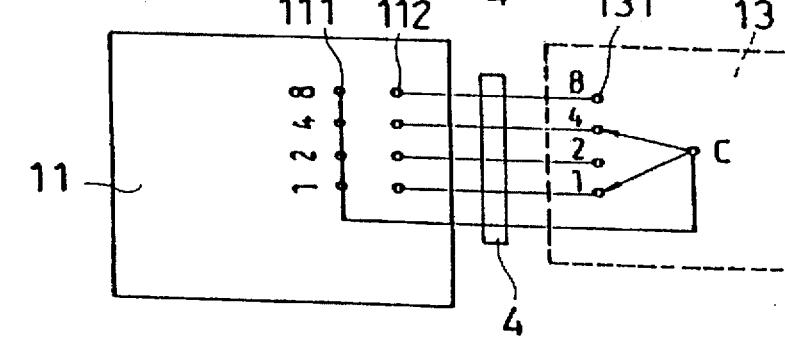
FIG. 3E is an illustration similar to that of FIG. 3, but showing the rotary binary DIP switch switched to the fifth position.
Figures 5, 5A:
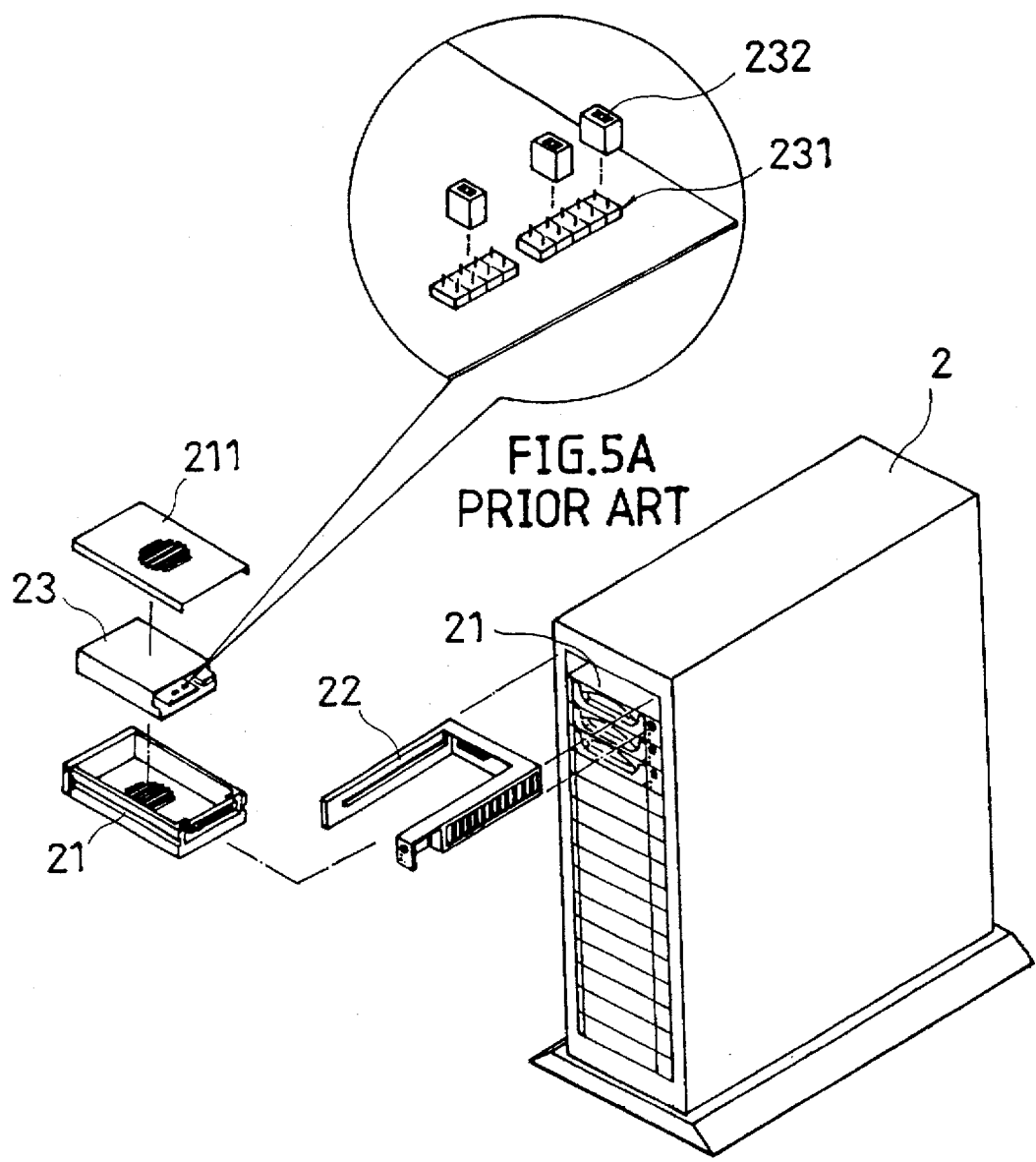
FIG. 5 is an exploded view of a prior art array hard diskdrive system.
FIG. 5A is an enlarged view of the rear part of the hard diskdrive shown in FIG. 5.

The table shown in FIG. 4 indicates the internal connection between contact C and the contacts 131 of rotary binary DIP switch 13, which are respectively connected to the jumper terminals of the second line 112. FIGS. from 3A to 3E show the connection between contact C and the contacts 131 from position 1 to position 5.

As indicated, the present invention provides a hard diskdrive address adjusting device which permits the address of each hard diskdrive of an array hard diskdrive system to be conveniently adjusted by rotation of a respective rotary binary DIP switch, without pulling each hard diskdrive out of the housing of the array hard diskdrive system. Further, the adjusted address of each hard diskdrive is indicated on the face of each respective binary DIP switch.

I claim:

1. A hard diskdrive address adjusting device for use in an array hard diskdrive system, wherein each of a plurality of hard diskdrives includes a plurality of jumper terminals arranged in two rows for establishing a binary address by selectively coupling across the two rows selected pairs of the jumper terminals, the device comprising:

a housing;

a plurality of hard diskdrive mounting frames arranged at different elevations within said housing, each of said plurality of hard diskdrive mounting frames having a respective one of said plurality of hard diskdrives mounted therein;

a plurality of rotary switches respectively electrically coupled to said plurality of hard diskdrives, each of said rotary switches having (1) a common terminal coupled in parallel relation with one of said two rows of jumper terminals of a respective hard diskdrive, and (2) a plurality of switched terminals coupled respectively to said plurality of jumper terminals of the other of said two rows of jumper terminals, each said rotary switch providing a connection between said common terminal and one or more of said plurality of switched terminals in accordance with a binary code responsive to a rotary position of an actuator of said rotary switch, wherein each of said plurality of rotary switches is switched to provide a different binary code for selectively addressing said plurality of hard diskdrives.

* * * * *